US012171196B2

(12) United States Patent
Lonkar et al.

(10) Patent No.: US 12,171,196 B2
(45) Date of Patent: Dec. 24, 2024

(54) METHOD AND SYSTEM FOR MONITORING AND MEASURING THE BEHAVIOR OF A PLURALITY OF ANIMALS

(71) Applicant: Tata Consultancy Services Limited, Mumbai (IN)

(72) Inventors: Vaibhav Sadashiv Lonkar, Pune (IN); Dinesh Kumar Singh, Thane (IN); Karthik Srinivasan, Chennai (IN); Shubhadra Varma Pusapati, Hyderabad (IN); Saibhargavi Gurram, Hyderabad (IN); Jayantrao Mohite, Thane (IN); Sanat Sarangi, Thane (IN); Srinivasu Pappula, Hyderabad (IN); Suryakant Ashok Sawant, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 399 days.

(21) Appl. No.: 17/663,653

(22) Filed: May 16, 2022

(65) Prior Publication Data

US 2023/0060020 A1 Feb. 23, 2023

(30) Foreign Application Priority Data

Jul. 30, 2021 (IN) .............. 202121034408

(51) Int. Cl.
*A01K 29/00* (2006.01)
*A01K 1/00* (2006.01)
(Continued)

(52) U.S. Cl.
CPC .......... *A01K 29/005* (2013.01); *A01K 1/0082* (2013.01); *G06K 19/0723* (2013.01); *G06V 40/10* (2022.01); *G06V 40/20* (2022.01)

(58) Field of Classification Search
CPC .............. A01K 29/005; A01K 1/0082; G06K 19/0723; G06V 40/10; G06V 40/20
See application file for complete search history.

(56) References Cited

U.S. PATENT DOCUMENTS

2007/0107075 A1* 5/2007 Klein ................. A01K 67/0276
435/320.1
2008/0314325 A1 12/2008 Hempstead et al.
(Continued)

FOREIGN PATENT DOCUMENTS

| CA | 2872841 C | 8/2019 |
| CN | 104077550 A | 10/2014 |
| CN | 103488148 B | 3/2016 |

OTHER PUBLICATIONS

Wurtz, Kaitlin et al., "Recording behaviour of indoor-housed farm animals automatically using machine vision technology: A systematic review", Research Articles, Date: Dec. 2019, Publisher: Plos One, https://journals.plos.org/plosone/article/file?id=10.1371/journal.pone.0226669&type=printable.
(Continued)

*Primary Examiner* — Ming Y Hon
(74) *Attorney, Agent, or Firm* — FINNEGAN, HENDERSON, FARABOW, GARRETT & DUNNER, LLP

(57) ABSTRACT

Monitoring of animals in a herd has various challenges. A method and a system for monitoring and measuring the behavior of a plurality of animals in a herd chamber is provided. The disclosure provides a method to develop a model to identify the animal interactions between a given set of herds of two or more animals. The system uses image, RFID sensors, animal phenotyping information such as species, breed, age and reproduction cycle information to generate an animal profile. This profile is used to quantify the interaction into an aggression score to the animals in the
(Continued)

given herd. The aggression score over a given duration can help herd manager to put the animals with similar aggression score together. This will also help analyze the temporal aspects of the aggression score for a given animal and take preventive measures.

20 Claims, 4 Drawing Sheets

(51) Int. Cl.
*G06K 19/07* (2006.01)
*G06V 40/10* (2022.01)
*G06V 40/20* (2022.01)

(56) References Cited

U.S. PATENT DOCUMENTS

| | | | |
|---|---|---|---|
| 2010/0111359 A1* | 5/2010 | Bai | A01K 29/005 382/103 |
| 2020/0375148 A1* | 12/2020 | Magazz? | A61B 5/0002 |
| 2021/0176982 A1* | 6/2021 | Kleckner | A01M 31/002 |
| 2022/0007618 A1* | 1/2022 | Berckmans | A01K 29/005 |
| 2022/0159934 A1* | 5/2022 | Molloy | A01K 29/005 |
| 2023/0000057 A1* | 1/2023 | Kim | G06Q 30/0251 |
| 2024/0251758 A1* | 8/2024 | Fukada | A01K 11/00 |

OTHER PUBLICATIONS

Matthews, Stephen G. et al, "Automated tracking to measure behavioural changes in pigs for health and welfare monitoring", Scientific Reports, Date: Dec. 2019, Publisher: Nature, https://www.nature.com/articles/s41598-017-17451-6.pdf.

Xu, Haocheng et al., "Analysis of Cattle Social Transitional Behaviour: Attraction and Repulsion", Sensors, Date: Sep. 2020. vol. 20(18), Publisher: MDPI, https://www.mdpi.com/1424-8220/20/18/5340.

Hulsman Hanna, Lauren L. et al., "Evaluation of Methods to Measure Temperament in Cattle and Their Impacts on Predictions of Genetic Merit", Research, Date: Sep. 2020, Publisher: NDSU Agriculture, https://www.ag.ndsu.edu/centralgrasslandsrec/archive/cgrec-annual-reports-1/2018-annual-report/10bCGRECAR18HannaandDahlen.pdf.

Fallahi, Sepideh, "Behavioral genetics in Cattle—a review", Journal of Livestock Science, Date: Oct. 2029, vol. 10(2), Publisher: Livestock Science, http://livestockscience.in/wp-content/uploads/Behav-genetics-cattle.pdf.

Camille, Karen, "Using an observer rating method to assess the effects of rotational stocking method on beef cattle temperament over time", Impact of training on good practices of handling on stockpersons attitude, behavior and cattle welfare, Date: 2016, vol. 45(9), pp. 501-508, Publisher: Revista Brasileira de Zootecnia, https://www.scielo.br/j/rbz/a/3BgC6w4hSHjQcjFpvXCqb7t/?lang=en&format=pdf.

* cited by examiner

METHOD AND SYSTEM FOR MONITORING AND MEASURING THE BEHAVIOR OF A PLURALITY OF ANIMALS

PRIORITY CLAIM

This U.S. patent application claims priority under 35 U.S.C. § 119 to: Indian patent application No. 202121034408, filed on Jul. 30, 2021. The entire contents of the aforementioned application are incorporated herein by reference.

TECHNICAL FIELD

The disclosure herein generally relates to the field of animal monitoring in a herd, and, more particularly, to method and system for monitoring and measuring the behavior of a plurality of animals in a herd chamber.

BACKGROUND

There are various places like dairy, shelter houses etc. where animals like cow, buffalo, sheep etc. are kept together in a herd. The herd consists of animals of different breed, age, and gender. Each animal exhibits its own unique behavior. Some of them could be aggressive due to genetics, or due to other types of stress. Aggressive animals with horns generally pushes or strikes other animals, causing injury. They may also kick, crush or blunt the human caretaker. Hence, it is crucial to identify the pattern and the potential reason of such stress and aggression.

Some of the ways to manually identify the aggressive pattern in the animals are observed when they flatten their ears or lower their head in attacking mode and hunch their shoulders. They may turn a side to show their flank or shake their head vigorously, or even raise hackles.

Many methods and solutions have been proposed on animal monitoring using sensors, devices, radio-frequency identification device (RFID), videos, etc. but none of the methods/inventions are focusing on considering the animal behavior and aggression patterns.

SUMMARY

Embodiments of the present disclosure present technological improvements as solutions to one or more of the above-mentioned technical problems recognized by the inventors in conventional systems. For example, in one embodiment, a system for monitoring and measuring the behavior of a plurality of animals in a herd chamber is provided. The system comprises a first set of sensors, a second set of sensors, an input/output interface, one or more hardware processors, and a memory. The first set of sensors provides a first input data, wherein the first set of sensors are present at a plurality of locations in the herd chamber. The second set of sensors for collects a second input data, wherein the second set of sensors is present on each of the plurality of animals. The input/output interface for providing historical data related to the plurality of animals from a database. The memory is in communication with the one or more hardware processors, wherein the one or more first hardware processors are configured to execute programmed instructions stored in the one or more first memories, to: identify one or more patterns from the first input data and the second input data, wherein the one or more patterns are related to animal position, movement and interactions; mapping the identified one or more patterns with a behavior table to generate an animal behavior score (ABS), dynamically, for each of the plurality of animals, wherein the ABS quantifies the behavior of the corresponding animal; generating an animal interaction score (AIS) for each of the plurality of animals with respect to other animals by: comparing the ABS of the one animal with the ABS of the another animal in neighborhood in the herd chamber, and using the identified one or more patterns; deriving an animal aggression score (AAS) over a period of time by adopting to temporal and spatial movement of the plurality of animals using the historical data; deriving a herd aggression score by calculating median of the animal aggression scores of the each of the plurality of animals in the herd chamber; determining the behavior of one or more animals amongst the plurality of animals by comparing their aggression score with the herd aggression score based on a predefined set of conditions; and representing the determined behavior of one or more animals on a display screen.

In another aspect, a method for monitoring and measuring the behavior of a plurality of animals in a herd chamber. Initially, a first input data is collected from a first set of sensors, wherein the first set of sensors is present at a plurality of locations in the herd chamber. Similarly, a second input data is collected from a second set of sensors present on each of the plurality of animals. And historical data related to the plurality of animals is collected from a data repository. In the next step, one or more patterns are identified from the first input data and the second input data, wherein the one or more patterns are related to animal position, movement and interactions. The identified one or more patterns are mapped with a behavior table to generate an animal behavior score (ABS), dynamically, for each of the plurality of animals, wherein the ABS quantifies the behavior of the corresponding animal. Further an animal interaction score (AIS) is generated for each of the plurality of animals with respect to other animals by: comparing the ABS of the one animal with the ABS of another animal in neighborhood in the herd chamber, and using the identified one or more patterns. In the next step, an animal aggression score (AAS) is derived over a period of time by adopting to temporal and spatial movement of the plurality of animals using the historical data. Further, a herd aggression score is derived by calculating median of the animal aggression scores of the each of the plurality of animals in the herd chamber. In the next step, the behavior of one or more animals is derived amongst the plurality of animals by comparing their aggression score with the herd aggression score based on a predefined set of conditions. And finally, the determined behavior of one or more animals is displayed on a display screen.

In yet another aspect, one or more non-transitory machine-readable information storage mediums comprising one or more instructions which when executed by one or more hardware processors cause monitoring and measuring the behavior of a plurality of animals in a herd chamber. Initially, a first input data is collected from a first set of sensors, wherein the first set of sensors is present at a plurality of locations in the herd chamber. Similarly, a second input data is collected from a second set of sensors present on each of the plurality of animals. And historical data related to the plurality of animals is collected from a data repository. In the next step, one or more patterns are identified from the first input data and the second input data, wherein the one or more patterns are related to animal position, movement and interactions. The identified one or more patterns are mapped with a behavior table to generate an animal behavior score (ABS), dynamically, for each of the plurality of animals, wherein the ABS quantifies the behavior of the corresponding animal. Further an animal interaction score (AIS) is generated for each of the plurality of animals with respect to other animals by: comparing the ABS of the one animal with the ABS of another animal in neighborhood in the herd chamber, and using the identified one or more patterns. In the next step, an animal aggression score (AAS) is derived over a period of time by adopting to temporal and spatial movement of the plurality of animals using the historical data. Further, a herd aggression score is derived by calculating median of the animal aggression scores of the each of the plurality of animals in the herd chamber. In the next step, the behavior of one or more animals is derived amongst the plurality of animals by comparing their aggression score with the herd aggression score based on a predefined set of conditions. And finally, the determined behavior of one or more animals is displayed on a display screen.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
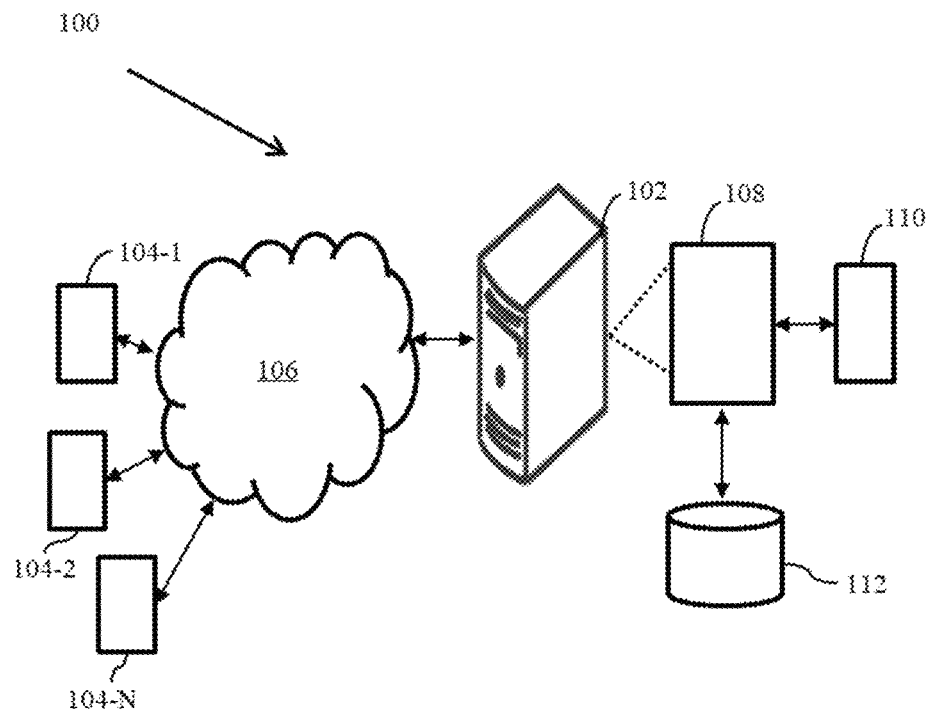
FIG. 1 illustrates an exemplary block diagram of a system for monitoring and measuring the behavior of a plurality of animals in a herd chamber according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Most of the prior arts focus on monitoring of individual animals and no one considered interactions between the animals in the herd. Some of the prior arts are using historical data and lookup table approach for animal behavior monitoring and not considering real-time information. This may add errors or bias in monitoring or quantifying.

The present disclosure provides a technical solution to the above-mentioned technical problems by providing a method and a system for monitoring and measuring the behavior of a plurality of animals in a herd chamber. The disclosure provides a method to develop a model to identify the animal interactions between a given set of herds of two or more animals. The system uses image, RFID sensors, animal phenotyping information such as species, breed, age and reproduction cycle information to generate an animal profile. This profile is used to quantify the interaction into an aggression score to the animals in the given herd. The aggression score over a given duration can help herd manager to put the animals with similar aggression score together. This will also help analyze the temporal aspects of the aggression score for a given animal and take preventive measures. The model also takes the feedback of the herd manager to correct the observations and learns better.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

According to an embodiment of the disclosure, FIG. 1 illustrates a network diagram of a system 102 for monitoring and measuring the behavior of a plurality of animals in a herd chamber or a pen structure. It should be appreciated that the herd chamber is not limited to one chamber, there could more than one chambers or pen structures where the animals are present.

It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104, collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
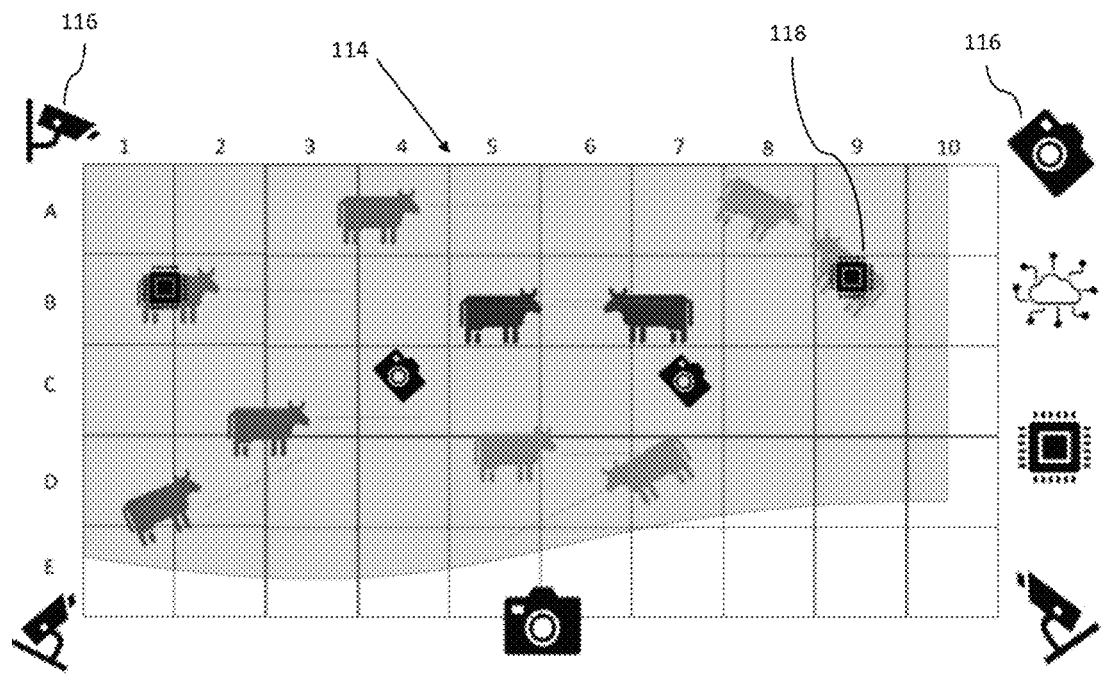
FIG. 2 illustrates a schematic representation of a herd chamber used in the system of FIG. 1 in accordance with some embodiments of the present disclosure.

According to an embodiment of the disclosure, the computing device 102 is in communication with a herd chamber 114. A schematic representation of the herd chamber 114 is shown in FIG. 2. The herd chamber 114 is having a grid layout and multiple virtual chambers are there in the herd chamber 114. The system 100 comprises a first set of sensors 116 and a second set of sensors 118. The first set of sensors 116 are installed in the herd chamber 114. The first set of sensors 116 comprises mobile phone cameras, CCTV cameras, media sensors etc. The first set of sensors 116 is mounted at different locations. The second set of sensors 118 is present on each animal. The second set of sensors 118 may be an RFID tag, global positioning system (GPS) etc. The use of any other kind of location detection sensors are well within the scope of this disclosure. Few of the animals which are already classified as aggressive animals based on the historical data, have other types of sensors like pedometer.

In a herd of animals, the second set of sensors 118 like GPS, RFID and injectable sensors are put on the animals in the herd. There are various types of the first set of sensors 116. The first set of sensors 116 comprises cameras mounted on the walls to cover 360 degree view of the herd. Besides there may be cameras mounted on ropes to allow their movement and capture a closer view based on the triggers. There may be cameras and other sensors mounted on a moving rover, which can go closer to the animal and capture more details or parameters such as temperature, floor wetness or moisture, animal pictures, etc. Besides, a herd manager may have mobile phone apps to monitor and capture other phenotypic observations.

The first set of sensors 116 also comprises an airborne surveillance unit. The airborne surveillance unit comprises an airframe configured for autonomous powered flight, a sensor module comprising of one or more image detection sensors for observing earth below in a plurality of spectral bands and a pattern recognition module.

According to an embodiment of the disclosure, the first set of sensors 116 and the second set of sensors 118 in combination are used to monitor the behavior of the animals in the herd chamber 114. The behavior of the animal can be deduced based on various criteria. An aggressive or fearful animal may bellow, rub the head, turn sideways to show off its size, shake its horns or head, snorts and so on. Images of these animals are taken at regular time interval and map it to a behavior table associated with the animal RFID. Comparison with a behavior table helps in understanding the animal behavior at a given time. A particular behavior triggers a particular behavior pattern observation set and based on the criteria defined in the set, the next set of the animal observations are taken. The set have the criteria like the instant behavior, predicted next tree of the potential behavior, frequency of the next images to be taken, and duration between each of the images taken, and so on. Each set is a state in a state machine, where the state of the animal is constantly changing based on the continuous data streaming from the system setup. These observations are further used by the system 102 deriving a trajectory of the animals from the images taken from the various image sensors, cameras mounted in the herd location as well as on the aerial and ground based vehicles.

Figure 3:
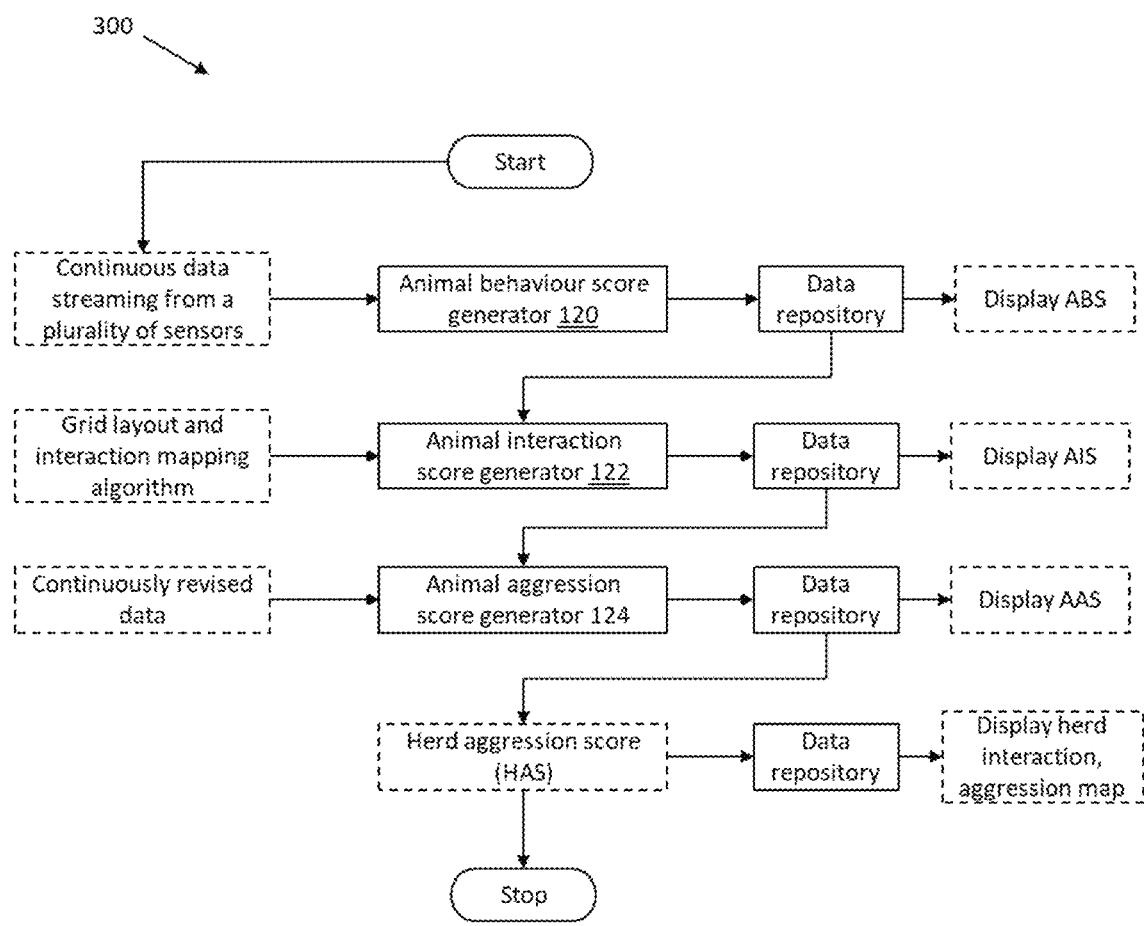
FIG. 3 is a functional flow diagram of the system of FIG. 1 according to some embodiments of the present disclosure.

FIG. 3 shows a functional flow diagram of the system 100 of FIG. 1 according to some embodiments of the present disclosure. The system 100 further comprises an animal behavior score (ABS) generator 120, an animal interaction score (AIS) generator 122, and an animal aggression score (AAS) generator 124 as shown in FIG. 3.

According to an embodiment of the disclosure, the ABS generator 120 is configured to generate the Animal Behavior Score (ABS) based on the continuous monitoring of animal behavior. The present disclosure uses identification, positioning and image data of the animals on a continuous basis using animal-mounted RFID and GPS trackers, along with hand-held/wall-mounted/moving camera. Feed from these sources is used to generate a continuously adjusting ABS. The ABS quantifies the behavior of an animal, viz. how calm, aggressive, curious and/or passive an animal is. It is continuously compared with immediate previous data to determine if there is a change in animal or its body part position. This helps to understand a change in animal behavior over a period. This quantification is used to label the behavior and temperament of an animal multiple times in a day on a regular basis. The generated ABS is stored in the data repository 112 and also displayed on the I/O interface 104.

According to an embodiment of the disclosure, the AIS generator 122 is configured to generate the animal interaction score (AIS) based on the continuous monitoring of animal behavior with respect to another animal in the herd chamber 114. The position of each animal and their body parts, like head, limbs, tail and ears, and their direction are monitored using GPS, hand-held/moving/wall-mounted camera and any other electronic media. Similar position of all the animals and their body parts are monitored in the given herd area. Based on this, a relative position of each animal is generated with respect to other animals in the vicinity. This is analyzed to convert the relative position of animal into a definite interaction or non-interaction and the corresponding AIS is generated. The generated AIS is stored in the data repository 112 and also displayed on the I/O interface 104.

According to an embodiment of the disclosure, the AAS generator is configured to generate the animal aggression score (AAS) based on spatial-temporal movement of the animals. The system 100 is configured to monitor and maintain a running list of neighboring animals of each animal along with their AIS. In an animal network, each animal is a node with its own ABS and there are other peer animals in the vicinity of this node. At all the times these animals are monitored, a list of peer neighborhood animals per node (where a node is the animal of focus at a given moment) and the AIS for each neighboring peer node is maintained at a given time. The aggression score between a pair of animals is used to create an optimized animal holding pen structure to save money, by placing compatible and non-aggressive animals together and aggressive animals in a solitary pen. The generated AAS is stored in the data repository 112 and also displayed on the I/O interface 104.

According to an embodiment of the disclosure, the system 102 is also configured to derive a herd aggression score (HAS). The herd aggression score is calculated by calculating median of the animal aggression scores of the each of the plurality of animals in the herd chamber.

Figure 4:
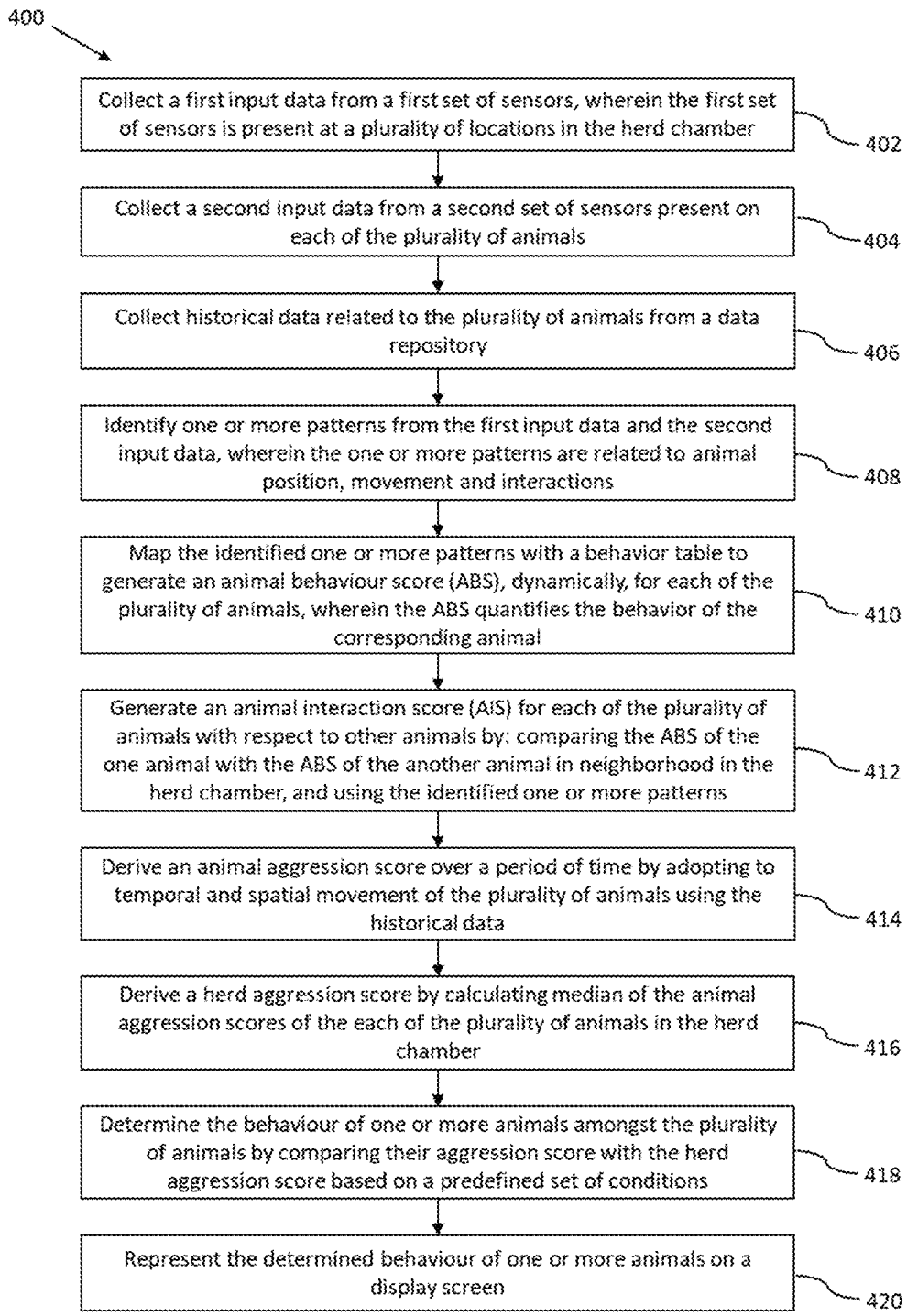
FIG. 4 is a flow diagram illustrating a method for monitoring and measuring the behavior of a plurality of animals in a herd chamber in accordance with some embodiments of the present disclosure.

FIG. 4 illustrates an example flow chart of a method 400 for monitoring and measuring the behavior of a plurality of animals in a herd chamber, in accordance with an example embodiment of the present disclosure. The method 400 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 100. However, the operations of the method 400 can be described and/or practiced by using any other system.

Initially at step 402, a first input data is collected from a first set of sensors, wherein the first set of sensors 116 is present at the plurality of locations in the herd chamber 114. The first set of sensors 116 comprises mobile phone cameras installed in the herd chamber, CCTV cameras or any other form of tracking devices. Similarly, at step 404, of the method 400 the second input data is collected from the second set of sensors 118 installed on each of the plurality of animals. The second set of sensors 118 comprises RFID sensors, GPS or any other similar sensors for tracking the movement of the plurality of animals in the herd chamber 114. Similarly, at step 406, historical data related to the plurality of animals is collected from the data repository 112.

Further at step 408, one or more patterns are identified from the first input data and the second input data, wherein the one or more patterns are related to animal position, movement and interactions.

At step 410, the identified one or more patterns are mapped with a behavior table to generate the animal behavior score (ABS), dynamically, for each of the plurality of animals. The ABS quantifies the behavior of the corresponding animal. The behavior table is generated based on the historical data of the plurality of animals using the first and the second set of sensors. Here the approach is to generate that behavior table can be machine learning or simple thresholds based on the sensors data. Moreover, it is updated regularly based on the recent interaction patterns of each an animal with others, to capture latest-past patterns too and also to maintain and rule out outlier conditions that arise out of certain temporal reasons, e.g. aggression due to injury or estrus cycle, that may go away once the healing/heat period passes. Thus, the ABS is used to label the behavior and temperament of an animal multiple times in a day on a regular basis. The ABS calculation is a function of position of animals captured using the first and the second set of sensors and other phenotypic observations as shown below:

Animal Behavior score (ABS)=$f$ {position of the animal using GPS, sensor and camera and other phenotypic observations}–for $i$=1 to $n$ animals in the herd chamber    (1)

Further at step 412, the animal interaction score (AIS) is generated for each of the plurality of animals with respect to other animals by comparing the ABS of the one animal with the ABS of another animal in neighborhood in the herd chamber 114, and using the identified one or more patterns. AIS is a relative score of two animals to each other and an animal interaction mapping model helps interpret the position data and animal behavior score into animal interaction score.

The position of the plurality of animal and their body parts, like head, limbs, tail and ears, and their direction are monitored and calculated using GPS, hand-held/moving/wall-mounted camera and any other electronic media. Based on the positions, relative position of each animal is generated with respect to other animals in the vicinity. This is analyzed to convert the relative position of animal into a definite interaction or non-interaction and the corresponding Animal Interaction Score. Thus, the AIS can be represented as follows:

Animal Interaction score=$f$ {{$ABS_i$ of animal$_i$, $POS_i$ of animal$_i$}, {$ABS_j$ of animal$_j$, $POS_j$ of animal$_j$}, Interaction mapping model}, for $i,j$=1 to $p$    (2)

where p is the total number of animals in the peer or neighborhood of each animal i and j; $ABS_i$, $POS_i$, $ABS_j$, $POS_j$ are ABS and positions of the animals over a period of time.

At step 414, the animal aggression score (AAS) is generated over a period of time by adopting to temporal and spatial movement of the plurality of animals using the historical data. According to an embodiment of the disclosure, an animal network is created where each animal is a node with its own ABS and there are other peer animals in the vicinity of this node. The aggression score between a pair of animals is further used to create an optimized animal holding pen structure to save money, by placing compatible and non-aggressive animals together and aggressive animals in a solitary pen. Thus, the AAS is represented as follows:

Animal Aggression score=$f$ {index the AIS in the animal aggression model and average it for all peer or neighborhood animal}    (3)

Further at step 416, the herd aggression score is derived by calculating median of the animal aggression scores of the each of the plurality of animals in the herd chamber. The herd score is represented as follows:

Herd Aggression score=$f$ {median of the aggression score of all the animals in the herd chamber}    (4)

At step 418, the behavior of one or more animals amongst the plurality of animals is determined by comparing their aggression score with the herd aggression score based on a predefined set of conditions. And finally at step 420, the determined behavior is represented one or more animals on a display screen. The behavior of the animal comprises one or more of standing, moving, mounting, jumping or targeting to attack.

According to another embodiment of the disclosure, the system 102 is also configured to keep the log of a spatial-temporal historical record. When the records reach a set threshold, the historical data of each animal node and it's interaction with neighborhood nodes is processed and analyzed. If a previous record of such interaction and aggression score is present, all the scores generated till date are used to create an Interaction Score Adjustment Factor (ISAF) generated with reducing weighted average reverse chronologically OR moving average of last 5 interactions between the same animal pair OR just a simple mean. The ISAF is added to current score to derive the most recent score.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to the monitoring of the plurality of animals in the herd chamber. The embodiment, thus provides the method and system for monitoring and measuring the behavior of a plurality of animals in a herd chamber It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for monitoring and measuring the behavior of a plurality of animals in a herd chamber, the method comprising:
    collecting a first input data from a first set of sensors, wherein the first set of sensors is present at a plurality of locations in the herd chamber;
    collecting a second input data from a second set of sensors present on each of the plurality of animals;
    collecting, via one or more hardware processors, historical data related to the plurality of animals from a data repository;
    identify, via the one or more hardware processors, one or more patterns from the first input data and the second input data, wherein the one or more patterns are related to animal position, movement and interactions;
    mapping, via the one or more hardware processors, the identified one or more patterns with a behavior table to generate an animal behavior score (ABS), dynamically, for each of the plurality of animals, wherein the ABS quantifies the behavior of the corresponding animal;
    generating, via the one or more hardware processors, an animal interaction score (AIS) for each of the plurality of animals with respect to other animals by:
        comparing the ABS of the one animal with the ABS of the another animal in neighborhood in the herd chamber, and
        using the identified one or more patterns;
    deriving, via the one or more hardware processors, an animal aggression score (AAS) over a period of time by adopting to temporal and spatial movement of the plurality of animals using the historical data;
    deriving, via the one or more hardware processors, a herd aggression score by calculating median of the animal aggression scores of the each of the plurality of animals in the herd chamber;
    determining, via the one or more hardware processors, the behavior of one or more animals amongst the plurality of animals by comparing their aggression score with the herd aggression score based on a predefined set of conditions; and representing, via the one or more hardware processors, the determined behavior of one or more animals on a display screen.

2. The method of claim 1, wherein the behavior of an animal from amongst the plurality of animals comprises one or more of standing, moving, mounting, jumping or targeting to attack.

3. The method of claim 1 further comprising creating an animal network of the plurality of animals, wherein each animal of the plurality of animals is a node having own ABS, wherein ABS further comprising other peer animals in the vicinity of the node.

4. The method of claim 1 further comprising creating an optimized animal holding pen structure, by placing compatible and non-aggressive animals together and aggressive animals in a solitary pen based on the respective AIS.

5. The method of claim 1, wherein one or more patterns are generated by continuously comparing with immediate previous data to determine if there is a change in animal or animal's body part position.

6. The method of claim 1, wherein the plurality of sensors comprises an airborne surveillance system, wherein the airborne surveillance system comprises an airframe configured for autonomous powered flight, a sensor module comprising of one or more image detection sensors for observing earth below in a plurality of spectral bands and a pattern recognition module.

7. The method of claim 6 further comprising communication with a monitoring and surveillance unit, wherein the monitoring and surveillance unit comprises one or more display units, an audio alerting or announcement system, and a sprinkler.

8. The method of claim 7 further comprising transmitting and receiving a plurality of data corresponding to the plurality of animals, via a transceiver, to the monitoring and surveillance component within a network.

9. A system for monitoring and measuring a behavior of a plurality of animals in a herd chamber, the system comprises:
a first set of sensors for providing a first input data, wherein the first set of sensors are present at a plurality of locations in the herd chamber;
a second set of sensors for collecting a second input data, wherein the second set of sensors is present on each of the plurality of animals;
an input/output interface for providing historical data related to the plurality of animals from a database;
one or more hardware processors;
a memory in communication with the one or more hardware processors, wherein the one or more first hardware processors are configured to execute programmed instructions stored in the one or more first memories, to:
identify one or more patterns from the first input data and the second input data, wherein the one or more patterns are related to animal position, movement and interactions;
map the identified one or more patterns with a behavior table to generate an animal behavior score (ABS), dynamically, for each of the plurality of animals, wherein the ABS quantifies the behavior of the corresponding animal;
generate an animal interaction score (AIS) for each of the plurality of animals with respect to other animals by:
comparing the ABS of the one animal with the ABS of the another animal in neighborhood in the herd chamber, and
using the identified one or more patterns;
derive an animal aggression score (AAS) over a period of time by adopting to temporal and spatial movement of the plurality of animals using the historical data;
derive a herd aggression score by calculating median of the animal aggression scores of the each of the plurality of animals in the herd chamber;
determine the behavior of one or more animals amongst the plurality of animals by comparing their aggression score with the herd aggression score based on a predefined set of conditions; and
represent the determined behavior of one or more animals on a display screen.

10. The system of claim 9, wherein the behavior of the animal comprises one or more of standing, moving, mounting, jumping or targeting to attack.

11. The system of claim 9 further comprises an optimized animal holding pen structure created by placing compatible and non-aggressive animals together and aggressive animals in a solitary pen based on the AIS.

12. The system of claim 9, wherein one or more patterns are generated by continuously comparing with immediate previous data to determine if there is a change in animal or animal's body part position.

13. The system of claim 9, further comprises an airborne surveillance system, wherein the airborne surveillance system comprises an airframe configured for autonomous powered flight, a sensor module comprising of one or more image detection sensors for observing earth below in a plurality of spectral bands and a pattern recognition module.

14. The system of claim 13 further comprises a monitoring and surveillance unit, wherein the monitoring and surveillance unit comprises one or more display units, an audio alerting or announcement system, and a sprinkler.

15. The system of claim 14 further comprises a transceiver configured to transmit and receive a plurality of data corresponding to the plurality of animals to the monitoring and surveillance unit within a network.

16. One or more non-transitory machine-readable information storage mediums comprising one or more instructions which when executed by one or more hardware processors cause:
collecting a first input data from a first set of sensors, wherein the first set of sensors is present at a plurality of locations in the herd chamber;
collecting a second input data from a second set of sensors present on each of the plurality of animals;
collecting, via the one or more hardware processors, historical data related to the plurality of animals from a data repository;
identify, via the one or more hardware processors, one or more patterns from the first input data and the second input data, wherein the one or more patterns are related to animal position, movement and interactions;
mapping, via the one or more hardware processors, the identified one or more patterns with a behavior table to generate an animal behavior score (ABS), dynamically, for each of the plurality of animals, wherein the ABS quantifies the behavior of the corresponding animal;

generating, via the one or more hardware processors, an animal interaction score (AIS) for each of the plurality of animals with respect to other animals by:
comparing the ABS of the one animal with the ABS of the another animal in neighborhood in the herd chamber, and
using the identified one or more patterns;
deriving, via the one or more hardware processors, an animal aggression score (AAS) over a period of time by adopting to temporal and spatial movement of the plurality of animals using the historical data;
deriving, via the one or more hardware processors, a herd aggression score by calculating median of the animal aggression scores of the each of the plurality of animals in the herd chamber;
determining, via the one or more hardware processors, the behavior of one or more animals amongst the plurality of animals by comparing their aggression score with the herd aggression score based on a predefined set of conditions; and
representing, via the one or more hardware processors, the determined behavior of one or more animals on a display screen.

17. The one or more non-transitory machine-readable information storage mediums of claim 16, wherein the behavior of an animal from amongst the plurality of animals comprises one or more of standing, moving, mounting, jumping or targeting to attack.

18. The one or more non-transitory machine-readable information storage mediums of claim 16, wherein each animal of the plurality of animals is a node having own ABS, wherein ABS further comprising other peer animals in the vicinity of the node.

19. The one or more non-transitory machine-readable information storage mediums of claim 16, by placing compatible and non-aggressive animals together and aggressive animals in a solitary pen based on the respective AIS.

20. The one or more non-transitory machine-readable information storage mediums of claim 16, wherein one or more patterns are generated by continuously comparing with immediate previous data to determine if there is a change in animal or animal's body part position.

* * * * *